United States Patent [19]

Ceshkovsky

[11] Patent Number: 5,590,102
[45] Date of Patent: Dec. 31, 1996

[54] RECORDING INFORMATIOIN ON AN OPTICAL DISC WITHOUT USING PRE-MANUFACTURED TRACKS

[75] Inventor: Ludwig Ceshkovsky, Fountain Valley, Calif.

[73] Assignee: Discovision Associates, Irvine, Calif.

[21] Appl. No.: 371,350

[22] Filed: Jan. 12, 1995

[51] Int. Cl.[6] .................................................. G11B 7/095
[52] U.S. Cl. ................................ 369/44.11; 369/44.14; 369/44.28; 369/44.37; 369/32
[58] Field of Search ........................... 369/44.37, 44.38, 369/44.14, 110, 118, 279, 44.28, 32, 112, 44.11; 250/201.5; 360/78.5

[56] References Cited

U.S. PATENT DOCUMENTS

| | | | |
|---|---|---|---|
| Re. 32,051 | 12/1985 | Ceshkovsky et al. | 369/44 |
| Re. 32,431 | 6/1987 | Dakin et al. | 358/338 |
| Re. 32,574 | 1/1988 | Ceshkovsky et al. | 369/32 |
| Re. 32,709 | 7/1988 | Ceshkovsky et al. | 369/44 |
| 3,633,038 | 1/1972 | Falk | 250/231 |
| 3,829,622 | 8/1974 | Elliot | 179/100.3 |
| 3,908,076 | 9/1975 | Broadbent | 178/6.7 A |
| 3,908,080 | 9/1975 | Broadbent | 178/6.6 R |
| 3,914,541 | 10/1975 | Elliott | 178/6.6 R |
| 3,924,062 | 12/1975 | Broadbent | 178/6.6 R |
| 3,944,727 | 3/1976 | Elliott | 178/6.6 R |
| 4,118,735 | 10/1978 | Wilkinson | 358/128 |
| 4,161,752 | 7/1979 | Basilico | 358/128 |
| 4,190,860 | 2/1980 | Somers et al. | 358/128.5 |
| 4,225,873 | 9/1980 | Winslow | 346/76 L |
| 4,228,326 | 10/1980 | Dakin et al. | 179/100.1 G |
| 4,232,201 | 11/1980 | Canino | 179/100.1 |
| 4,232,337 | 11/1980 | Winslow et al. | 358/128.5 |
| 4,234,837 | 11/1980 | Winslow | 318/577 |
| 4,236,105 | 11/1980 | Wilkinson | 318/577 |
| 4,239,942 | 12/1980 | Van Alem et al. | 179/100.1 G |
| 4,252,327 | 2/1981 | Elliott et al. | 364/213 |
| 4,271,334 | 6/1981 | Yardy | 369/41 |
| 4,282,598 | 8/1981 | Elliott | 369/44 |
| 4,322,837 | 3/1982 | Mickleson et al. | 369/44 |
| 4,337,538 | 6/1982 | Wilkinson et al. | 369/223 |
| 4,340,955 | 7/1982 | Elliott | 369/213 |
| 4,347,599 | 8/1982 | Vitale | 369/270 |
| 4,358,796 | 11/1982 | Ceshkovsky et al. | 358/322 |
| 4,358,802 | 11/1982 | Jarsen | 360/99 |
| 4,367,545 | 1/1983 | Elliott | 369/213 |
| 4,370,679 | 1/1983 | Ceshkovsky et al. | 358/318 |
| 4,371,899 | 2/1983 | Ceshkovsky et al. | 358/315 |
| 4,375,091 | 2/1983 | Dakin et al. | 369/32 |
| 4,439,848 | 3/1984 | Ceshkovsky et al. | 369/45 |
| 4,445,144 | 4/1984 | Giddings | 358/342 |
| 4,451,913 | 5/1984 | Elliott | 369/110 |
| 4,456,914 | 6/1984 | Winslow | 346/76 L |

(List continued on next page.)

FOREIGN PATENT DOCUMENTS 1687656  7/1991  Japan .

*Primary Examiner*—Thang V. Tran
*Attorney, Agent, or Firm*—Ronald J. Clark; Robert T. Braun; Arthur S. Bickel

[57] ABSTRACT

An apparatus for controlling the spacing between information tracks while recording information on an optical disc that does not have pre-manufactured information tracks. The invention employs a precision reference scale to guide the position of information tracks recorded on an optical disc. The reference scale is a linear strip with spaced optical tick marks. The spacing of the optical tick marks on the reference scale directly correlates to track pitch between information tracks recorded on the optical disc. The invention utilizes a first optical system for reading-from and writing-to an optical disc. A second optical system is used for detecting optical tick marks on the reference scale. The first optical system and the second optical system share common optical components. Optical components in common to both the first and second optical systems include a light source, a diffraction grating, a field lens, and a beam splitter. Components unique to each optical system includes an objective lens and a field lens for the first optical system and a beam splitter, objective lens and field lens for the second optical system. The first optical system operates in direct correlation with the second optical system during the recording process.

14 Claims, 5 Drawing Sheets

U.S. PATENT DOCUMENTS

| | | | |
|---|---|---|---|
| 4,465,977 | 8/1984 | Lopez de Romana | 328/120 |
| 4,467,467 | 8/1984 | Wilkinson | 369/111 |
| 4,477,890 | 10/1984 | Mooney et al. | 369/53 |
| 4,481,613 | 11/1984 | Yokota | 369/56 |
| 4,488,279 | 12/1984 | Wilkinson et al. | 369/54 |
| 4,504,939 | 3/1985 | Eberly | 369/46 |
| 4,516,177 | 5/1985 | Moon et al. | 360/77 |
| 4,536,863 | 8/1985 | Giddings | 369/43 |
| 4,566,090 | 1/1986 | Eberly | 369/46 |
| 4,571,716 | 1/1986 | Szerlip | 369/54 |
| 4,583,210 | 4/1986 | Winslow | 369/54 |
| 4,590,527 | 5/1986 | Warner | 360/78 |
| 4,607,956 | 8/1986 | Ishihara et al. | 356/375 |
| 4,611,318 | 9/1986 | Winslow | 369/54 |
| 4,648,084 | 3/1987 | Eberly | 369/46 |
| 4,701,898 | 10/1987 | Giddings | 369/32 |
| 4,703,467 | 10/1987 | Elliott | 369/44 |
| 4,706,133 | 11/1987 | Giddings | 358/342 |
| 4,727,532 | 2/1988 | Giddings | 369/43 |
| 4,751,692 | 6/1988 | Giddings | 369/32 |
| 4,759,007 | 7/1988 | Eberly | 369/58 |
| 4,774,699 | 9/1988 | Giddings | 369/32 |
| 4,791,289 | 12/1988 | Watanabe et al. | 250/237 G |
| 4,797,866 | 1/1989 | Yoshikawa | 369/44.28 X |
| 4,809,247 | 2/1989 | Elliott | 369/44 |
| 4,845,697 | 7/1989 | Giddings | 369/32 |
| 4,893,297 | 1/1990 | Gregg | 369/275 |
| 4,950,890 | 8/1990 | Gelbart | 250/237 |
| 4,980,878 | 12/1990 | Szerlip | 369/54 |
| 5,012,363 | 4/1991 | Mine et al. | 360/77.05 |
| 5,168,486 | 12/1992 | Yanagawa | 369/44.14 |
| 5,179,485 | 1/1993 | Tamayama | 360/106 |
| 5,270,886 | 12/1993 | Nigam | 360/78.05 |
| 5,315,372 | 5/1994 | Tsai | 356/358 |

RECORDING INFORMATIOIN ON AN OPTICAL DISC WITHOUT USING PRE-MANUFACTURED TRACKS

FIELD OF THE INVENTION

This invention generally relates to a method and apparatus for recording information on an optical disc without using pre-manufactured tracks. Particularly, the present invention relates to recording information on a portion of an optical disc that does not have pre-manufactured tracks for recording information.

BACKGROUND OF THE INVENTION

Information stored on an optical disc commonly appears as a spiral track known as an information track. The spiral information track of an optical disc is similar in appearance to the spiral grove of a vinyl record. There are varying types of optical discs that can be used for recording information. One type is a blank optical disc with no pre-manufactured tracks. Another type is an optical disc containing pre-manufactured information tracks for recording information. The method for recording information on each of these types of optical discs depends on the type of disc being used.

One method for recording information on a blank optical disc that does not have pre-manufactured tracks is referred to as mastering. Optical disc mastering involves recording information on a master optical disc that is subsequently used to directly or indirectly create replicating stampers for mass producing optical discs. Recording information on a master optical disc starts with a blank master optical disc having no pre-manufactured tracks. A mastering machine records information on a blank master disc by moving an optical head radially across the disc as the disc rotates. A blank master disc, however, has no information on the recording surface to aid a mastering machine in moving an optical head radially across the optical disc during the recording process. Therefore, mastering machines typically use a precision machined lead screw or a precision calibrated interferometer to move the optical head radially across the disc during the recording process, thus causing spiral tracks to be formed on the disc.

As alluded to above, optical disc mastering is primarily used by optical disc manufacturers that mass produce optical discs. Mastering machines tend to be very expensive and highly involved machines that are not well suited for consumer end-use. It may be worth noting that the actual master disc itself uses highly specialized and expensive optical disc technology that also makes it not well suited for consumer end-use.

In recent years, advances in optical disc technology has made it possible to economically manufacture optical disc recorders and recordable optical media as commercially viable consumer end-products. Examples of this technology include magneto optical (MO) discs and drives, mini-discs and mini-disc recorders, write-once-read-many (WORM) discs and drives, and compact disc recordable (CD-R) discs and drives. All of these technologies share the common feature of recording information on an optical disc that has pre-manufactured tracks for recording information. One reason for using discs with pre-manufactured tracks for recording information is to take advantage of established optical disc tracking technology used by compact disc players and video laser disc players. This tracking technology uses a tracking servo that takes advantage of existing tracks on an optical disc. The tracking servo keeps the optical head of a machine in line with either an information track or a track for recording information as the disc rotates by sensing the location of the track. The location of the track is determined by measuring the intensity of the beam reflected by the disc with a photodetector array. The intensity of a beam reflected by an optical disc is the least when the beam is reflected by either the information track portion of the disc or the track portion of the disc for recording information.

Thus, another method of recording information on an optical disc is by using optical discs with tracks for recording information manufactured directly into the recording surface of the disc.

OBJECT OF THE INVENTION

Recordable optical discs with pre-manufactured information tracks are, by necessity, the end result of some initial mastering process as described above. While mass producing recordable optical discs in this manner is commercially profitable, it is anticipated that more economical methods for mass producing recordable optical discs will be pursued.

One possible solution for reducing the cost of mass producing recordable optical discs is by manufacturing discs with no tracks on the disc. Eliminating tracks on the disc allows a manufacturer the possibility to reduce disc production costs by eliminating the mastering step. One method of manufacturing trackless discs without mastering is to stamp or cut discs out of a sheet of recordable media in the same fashion that a cookie cutter is used to cut cookies from a sheet of cookie dough. This method also allows a manufacturer to cut disc production costs by the nature of the increased speed at which discs can be manufactured.

It is conceivable that an optical disc manufactured by the above method may still require a small amount of disc information stored in a pre-recorded information track on the disc. It is possible that such information could be stamped into the disc with the stamping or cutting method described above, or that it may be recorded on the disc with a special recording device after the disc is stamped or cut out. The substantial cost saving measure, however, is to produce a recordable optical disc that, either in whole or in part, does not have pre-manufactured tracks for recording information.

A problem associated with recording information on a portion of an optical disc that does not have pre-manufactured tracks is that there is nothing on the recording surface of the disc to allow the optical head of a recorder to track or move across the disc during the recording process. This is essentially the same problem that occurs in optical disc mastering described above. As previously discussed, the methods employed by mastering such as using a precision machined lead screw or a precision calibrated interferometer are not very cost effective for mass producing affordable optical disc recorders. Therefore, it is an objective of the present invention to develop a more economical way to record information on a portion of an optical disc that does not have pre-manufactured tracks for recording information.

SUMMARY OF THE INVENTION

The present invention is for an improved method an apparatus for controlling the spacing between information tracks while recording information on an optical disc that does not have pre-manufactured tracks for recording information.

The invention employs a precision reference scale to guide the position of information tracks recorded on an optical disc. The reference scale is a linear strip with spaced optical tick marks. The spacing of the optical tick marks on the reference scale directly correlates to track pitch between information tracks recorded on the optical disc.

The invention utilizes a first optical system for reading-from and writing-to an optical disc. A second optical system is used for detecting optical tick marks on the reference scale. The first optical system and the second optical system share common optical components. Optical components in common to both the first and second optical systems include a light source, a diffraction grating, a field lens, and a beam splitter. The configuration of these common optical components causes a portion of the overall optical beam path to be common to both optical systems. Components unique to each optical system includes an objective lens and a field lens for the first optical system and a beam splitter, objective lens and field lens for the second optical system.

The first optical system operates in direct correlation with the second optical system during the recording process. When recording, a beam of radiant energy formed by the second optical system advances across the length of the reflective surface of the reference scale. Following the lead of the second optical system, the beam of radiant energy formed by the first optical system radially advances across the surface of a rotating optical disc in direct correspondence with the movement of the beam of radiant energy formed by the second optical system across the length of the reference scale.

The second optical system is disabled during the information retrieval process and tracking is handled solely by the first optical system following the information tracks formed on the optical disc during the recording process.

DETAILED DESCRIPTION OF THE PREFERRED EMBODIMENTS

Figure 1:
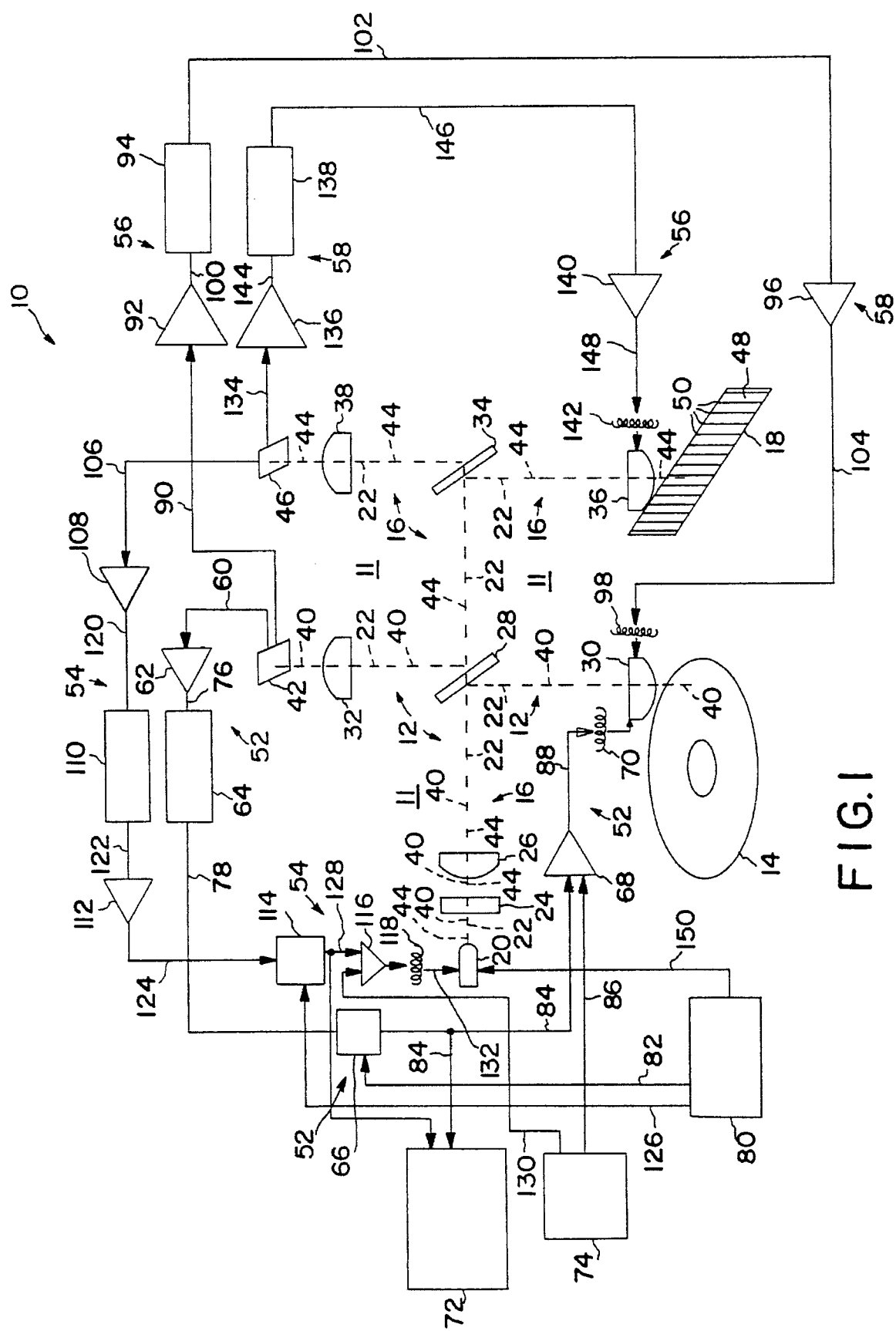
FIG. 1 is a schematic representation in block diagram form showing one embodiment of the optical disc apparatus according to the invention.

Referring to FIG. 1, there is shown an apparatus 10 for recording information on a portion of an optical disc that does not have pre-manufactured tracks. Apparatus 10 has an optical head configuration 11 comprising a first optical system 12 and a second optical system 16. First optical system 12 is used during the processes of recording information on and retrieving recorded information from an optical disc 14. Second optical system 16 is used exclusively in cooperation with first optical system 12 during the process of recording information on an optical disc. During the recording process, second optical system 16 tracks a precision optical reference scale 18 to control the pitch between information tracks recorded on optical disc 14 with first optical system 12. First optical system 12 follows the lead of second optical system 16 when recording information on optical disc 14.

First optical system 12 and second optical system 16 each share optical components that are common to both systems as well as utilizing separate optical components that are unique to each system. Optical components common to both first optical system 12 and second optical system 16 include a radiation source 20 for emitting a beam of radiant energy 22, a diffraction grating 24 for splitting beam of radiant energy 22 into two or more beams, a field lens 26, and a first beam splitter 28 (sometimes referred to as a partial mirror). Diffraction grating 24 may be either omitted or replaced with a collimating lens in a system utilizing a single beam of radiant energy.

Radiation source 20 can be any radiation source known to those skilled in the art that is suitable for creating a beam of radiant energy for retrieving information from and recording information to an optical disc. For example, radiation source 20 can be any laser diode that is commonly used in optical disc players and recorders.

Optical components unique to first optical system 12 include a first objective lens 30 and a first field lens 32. Optical components unique to second optical system 16 include a second beam splitter 34, a second objective lens 36, and a second field lens 38.

Beam of radiant energy 22 follows a first path 40 formed by the components of first optical system 12 as follows: radiation source 20 emits beam of radiant energy 22 so that it is transmitted through diffraction grating 24 and field lens 26, partially reflected by first beam splitter 28, transmitted through first objective lens 30 so that it impinges optical disc 14, reflected by optical disc 14, transmitted back through first objective lens 30, transmitted through first beam splitter 28, and transmitted through first field lens 32 so that it impinges photodetector array 42.

Beam of radiant energy 22 follows a second path 44 formed by the components of second optical system 16 as follows: radiation source 20 emits beam of radiant energy 22 so that it is transmitted through diffraction grating 24 and field lens 26, partially transmitted by first beam splitter 28, partially reflected by second beam splitter 34, transmitted through second objective lens 36 so that it impinges reference scale 18, reflected by reference scale 18, transmitted back through second objective lens 36, transmitted through second beam splitter 34, and transmitted through second field lens 38 so that it impinges photodetector array 46.

The function and operation of first optical system 12 and first optical system 16 can be switched by interchanging optical disc 14 and reference scale 18 to achieve a slightly different optical head configuration which operates functionally the same as optical head configuration 11.

Photodetector arrays 42 and 46 can be any common photodetector array configuration known by those skilled in the art for use with optical disc tracking and focus systems.

Reference scale 18 has a reflective surface 48 for reflecting beam of radiant energy 22 during the recording process. Reflective surface 48 has successively spaced reflective indicia 50 for allowing beam of radiant energy 22 to track along the length of reference scale 18. The spacing between reflective indicia 50 directly correlates with the spacing between information tracks recorded on optical disc 14.

Reflective surface 48 can be made of any suitable reflective material capable of having successively spaced reflective indicia 50 that can be identified by beam of radiant energy 22. One possible method of achieving the appropriate characteristics for reflective surface 48 is to use the same technology that is used by optical disc technology. Reflective indicia 50 on reflective surface 48 can be represented by spaced optical tick marks that are technologically the same as information tracks on the reflective surface of an optical disc. This technology is well known in the art and need not be discussed in detail here. It should be noted that the spacing between reflective indicia 50 does not have to be uniform.

Apparatus 10 has a first tracking system 52 for tracking already recorded information tracks on optical disc 14 during the information retrieval process. Apparatus 10 has a second tracking system 54 for tracking reflective indicia 50 on reference scale 18 during the recording process. Apparatus 10 has a first focus system 56 for focussing beam of radiant energy 22 on optical disc 14 during either the information retrieval or recording process. Apparatus 10 has a second focus system 58 for focusing beam of radiant energy 22 on reflective surface 48 of reference scale 18 during the recording process.

Photodetector array 42 outputs a first tracking information signal 60 to first tracking system 52. First tracking system 52 comprises a first tracking error detector 62, a first tracking servo 64, a first control 66, a first tracking driver 68, a first tracking actuator 70, a carriage control system 72 and a track position control 74. Note that carriage control system 72 and track position control 74 are common to both first tracking system 52 and second tracking system 54.

First tracking error detector 62 reads first tracking information signal 60 and determines whether beam of radiant energy 22 is properly tracking an information track on optical disc 14 or whether beam of radiant energy 22 is drifting off an information track on optical disc 14. If beam of radiant energy 22 is drifting off an information track on optical disc 14, first tracking error detector 62 determines the distance and direction in which beam of radiant energy 22 has drifted off of the information track. This information is output by first tracking error detector 62 as a first tracking error signal 76 to first tracking servo 64.

First tracking servo 64 reads first tracking error signal 76 and provides the required phase and gain compensation, if any, that should be used to properly align beam of radiant energy 22 with the information track being tracked. This information is output by first tracking servo 64 as a first tracking compensation signal 78 to the first control 66.

The operation of first control 66 is controlled by a read-write control 80. Read-write control 80 controls whether apparatus 10 is recording information on optical disc 14 or whether it is retrieving information from optical disc 14. Read-write control 80 outputs a first read-write control signal 82 to first control 60. First read-write control signal 82 specifies whether apparatus 10 is retrieving information from or recording information to optical disc 14. First control 60 transmits first tracking compensation signal 78 as a first control signal 84 to carriage control system 72 and first tracking driver 68, when first control 66 receives information from read-write control 80, via first read-write control signal 82, that apparatus 10 is retrieving information from optical disc 14.

Carriage control system 72 reads first control signal 84 to control a carriage motor (not shown) for adjusting coarse positioning of a carriage sled (not shown) during the information retrieval process. The carriage sled carries an optical head housing 290, shown in FIGS. 3 and 4.

Referring back to FIG. 1, track position control 74 outputs a first track position control signal 86 to first tracking driver 68. First tracking driver 68 combines first control signal 84 and first track position control signal 86 to generate a first tracking driver signal 88 to control first tracking actuator 70 during the information retrieval process. First tracking actuator 70 controls fine track positioning of first objective lens 30 during the information retrieval process.

First control 66 does not transmit first tracking compensation signal 78 when first control 66 receives information from read-write control 80, via first read-write control signal 82, that apparatus 10 is recording information to optical disc 14. First tracking system 52 only transmits first tracking compensation signal 78 during the information retrieval process and not during the recording process.

Photodetector array 42 outputs a first focus information signal 90 to first focus system 56. First focus system 56 comprises a first focus error detector 92, a first focus servo 94, a first focus driver 96, and a first focus actuator 98.

First focus error detector 92 reads first focus information signal 90 and determines whether beam of radiant energy 22 is properly focused on optical disc 14. First focus error detector 92 determines the degree that beam of radiant energy 22 is out of focus as it impinges optical disc 14, if it is out of focus at all. This information is output by first focus error detector 92 as a first focus error signal 100 to a first focus servo 94.

First focus servo 94 reads first focus error signal 100 and provides the required phase and gain compensation, if any, to properly focus beam of radiant energy 22 on optical disc 14. This information is output by first focus servo 94 as a first focus compensation signal 102 to a first focus driver 96. First focus driver 96 can be any electrical component or components suitable for insuring the integrity of first focus compensation signal 102. One possibility is to use an operational amplifier for first focus driver 96 to amplify first focus compensation signal 102.

First focus driver 96 transmits first focus compensation signal 102 as a first focus driver signal 104 to control first focus actuator 98. First focus actuator 98 responds to first focus driver signal 104 to control the spacial distance of first objective lens 30 from optical disc 14 to properly focus beam of radiant energy 22 on optical disc 14.

Photodetector array 46 outputs a second tracking information signal 106 to second tracking system 54. Second tracking system 54 comprises a second tracking error detector 108, a second tracking servo 110, a buffer amplifier 112, a second control 114, a second tracking driver 116, a second tracking actuator 118, carriage control system 72 and track position control 74.

Second tracking error detector 108 reads second tracking information signal 106 and determines whether beam of radiant energy 22 is properly tracking reflective indicia 50 on reference scale 18. If beam of radiant energy 22 is not properly tracking reference scale 18, second tracking error detector 108 determines the distance and direction in which beam of radiant energy 22 is off track. This information is output by second tracking error detector 108 as a second tracking error signal 120 to a second tracking servo 110.

Second tracking servo 110 reads second tracking error signal 120 and provides the required phase and gain compensation, if any, to properly align beam of radiant energy 22 with reference scale 18. This information is output by second tracking servo 110 as a second tracking compensation signal 122 to buffer amplifier 112.

Buffer amplifier 112 transmits second tracking compensation signal 122 as an intermediate second tracking compensation signal 124 to second control 114. Buffer amplifier 112 can be any electrical component or components suitable for insuring the integrity of second tracking compensation signal 122. One possibility is to use an operational amplifier for buffer amplifier 112 to amplify second tracking compensation signal 122.

The operation of second control 114 is controlled by a read-write control 80. Read-write control 80 controls whether apparatus 10 is recording information on optical disc 14 or whether it is retrieving information from optical disc 14. Read-write control 80 outputs a second read-write control signal 126 to second control 114. Second read-write control signal 126 specifies whether apparatus 11 is retrieving information from or recording information to optical disc 14. Second control 114 transmits intermediate second tracking compensation signal 124 as a second control signal 128 to carriage control system 72 and second tracking driver 116, when second control 114 receives information from read-write control 80, via second read-write control signal 126, that apparatus 10 is recording information on optical disc 14.

Carriage control system 72 reads second control signal 128 to control the carriage motor (not shown) for adjusting coarse positioning of the carriage sled (not shown) during the recording process.

Track position control 74 outputs a second track position control signal 130 to second tracking driver 116. Second tracking driver 116 combines second control signal 128 and second track position control signal 130 to generate a second tracking driver signal 132 to control second tracking actuator 118 during the recording process. Second tracking actuator 118 controls fine track positioning of beam of radiant energy 22 during the recording process.

Second control 114 does not transmit intermediate second compensation signal 124 when second control 114 receives information from read-write control 80, via second read-write control signal 126, that apparatus 10 is retrieving information from optical disc 14. Second tracking system 54 is only active during the recording process and is essentially disengaged during the information retrieval process, Photodetector array 46 outputs a second focus information signal 134 to second focus system 58. Second focus system 58 comprises a second focus error detector 136, a second focus servo 138, a second focus driver 140, and a second focus actuator 142.

Second focus error detector 136 reads second focus information signal 134 and determines whether beam of radiant energy 22 is properly focused on reflective surface 48 of reference scale 18. Second focus error detector 136 determines the degree that beam of radiant energy 22 is out of focus as it impinges reference scale 18, if it is out of focus at all. This information is output by second focus error detector 136 as a second focus error signal 144 to a second focus servo 138.

Second focus servo 138 reads second focus error signal 144 and provides the required phase and gain compensation, if any, to properly focus beam of radiant energy 22 on reflective surface 48 of reference scale 18. This information is output by second focus servo 138 as a second focus compensation signal 146 to a second focus driver 140. Second focus driver 140 can be any electrical component or components suitable for insuring the integrity of second focus compensation signal 146. One possibility is to use an operational amplifier for second focus driver 140 to amplify second focus compensation signal 146.

Second focus driver 140 transmits second focus compensation signal 146 as a second focus driver signal 148 to control second focus actuator 142. Second focus actuator 142 responds to second focus driver signal 148 to control the spacial distance of second objective lens 36 from reflective surface 48 of reference scale 18 to properly focus beam of radiant energy 22 on reflective scale 18.

Read-write control 80 generates radiation source control signal 150 to control the intensity of beam of radiant energy 22 emitted by radiation source 20. Beam of radiant energy 22 has a greater level of intensity during the recording process and a smaller level of intensity during the information process.

During the recording process, read-write control 80 causes radiation source 20 to emit beam of radiant energy 22 at an intensity of sufficient level to record information on optical disc 14. Beam of radiant energy 22 follows first path 40 formed by first optical system 12 causing optical disc 14 to be impinged by beam of radiant energy 22 and causing photodetector array 42 to be impinged by beam of radiant energy 22 reflected by optical disc 14. Beam of radiant energy 22 also follows second path 44 formed by second optical system 16 causing reflective surface 48 of reference scale 14 to be impinged by beam of radiant energy 22 and causing photodetector array 46 to be impinged by beam of radiant energy 22 reflected by reference scale 14.

Read-write control 80 activates second tracking system 54 and deactivates first tracking system 52 during the recording process by sending appropriate control signals to first control 66 and second control 114.

Second tracking system 54 operating in cooperation with second optical system 16 causes beam of radiant energy 22 to advance along the length of reflective surface 48 of reference scale 18 by tracking successive reflective indicia 50 on reflective surface 48. First optical system 12 follows the lead of second optical system 16 working in cooperation with second tracking system 54, by radially advancing beam of radiant energy 22 across the surface of rotating optical disc 14 in direct correspondence with the movement of beam of radiant energy 22, formed by second optical system 54, across the length of reference scale 18.

During the information retrieval process, read-write control 80 causes radiation source 20 to emit beam of radiant energy 22 at an intensity level sufficient to allow the retrieval of information from optical disc 14, while at the same time limiting the intensity so that the information already recorded on optical disc 14 is not recorded over and lost. Read-write control 80 activates first tracking system 52 and deactivates second tracking system 54 during the recording process by sending appropriate control signals to first control 66 and second control 114.

First optical system 12 operates in cooperation with first tracking system 52 in much the same fashion that conventional optical disc playback machines operate when retrieving information from an optical disc. First optical system 12 operating in cooperation with first tracking system 52 causes beam of radiant energy 22 to follow information tracks formed on optical disc 14 during a prior recording process.

Both first focus system 56 and second focus system 58 are used during the recording process. First focus system 56 ensures that beam of radiant energy 22 acquires focus on optical disc 14. Second focus system 58 ensures that beam of radiant energy 22 acquires focus on reflective surface 48 of reference scale 18. Only first focus system 56 is relied upon during the information retrieval process.

Figure 2:
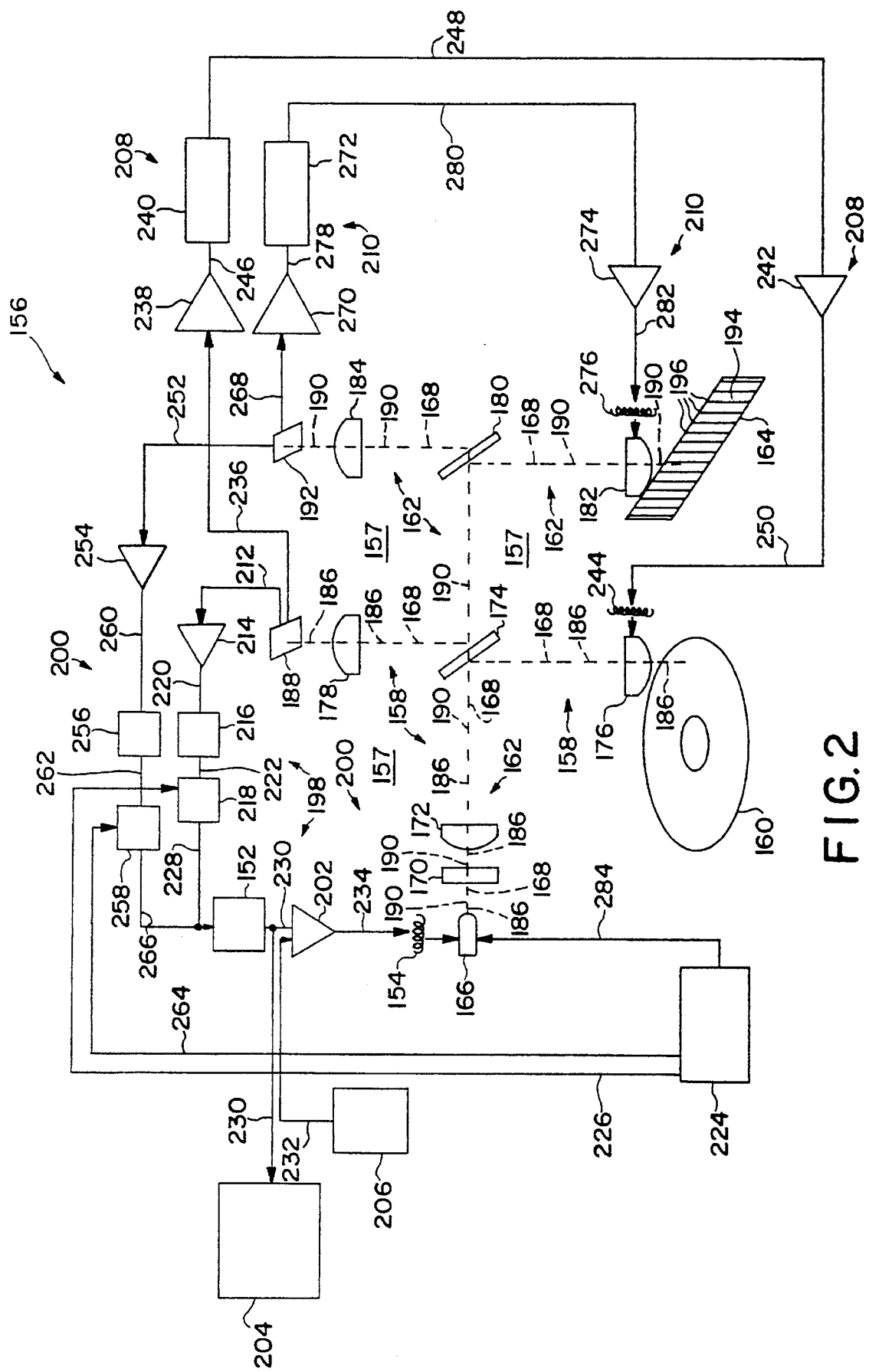
FIG. 2 is a schematic representation in block diagram form showing a second embodiment of the optical disc apparatus according to the invention whereby optical disc tracking and optical reference scale tracking use a common tracking servo and a common tracking actuator.

Referring to FIG. 2, there is shown a second embodiment of the apparatus according to the invention whereby optical disc tracking and optical reference scale tracking use a common tracking servo 152 and a common tracking actuator 154.

Apparatus 156 has an optical head configuration 157 comprising a first optical system 158 and a second optical system 162. First optical system 158 is used during the processes of recording information to and retrieving recorded information from an optical disc 160. Second optical system 162 is used exclusively in cooperation with first optical system 158 during the process of recording information on an optical disc. During the recording process, second optical system 162 tracks a precision optical reference scale 164 to control the pitch between information tracks recorded on optical disc 160 with first optical system 158. First optical system 158 follows the lead of second optical system 162 when recording information on optical disc 160.

First optical system 158 and second optical system 162 each share optical components that are common to both systems as well as utilizing separate optical components that are unique to each system. Optical components common to both first optical system 158 and second optical system 162 include a radiation source 166 for emitting a beam of radiant energy 168, a diffraction grating 170 for splitting beam of radiant energy 168 into two or more beams, a field lens 172, and a first beam splitter 174. Diffraction grating 170 may be either omitted or replaced with a collimating lens in a system utilizing a single beam of radiant energy.

Radiation source 166 can be any radiation source known to those skilled in the art that is suitable for creating a beam of radiant energy for retrieving information from and recording information to an optical disc. For example, radiation source 166 can be any laser diode that is commonly used in optical disc players and recorders.

Optical components unique to first optical system 158 include an first objective lens 176 and a first field lens 178. Optical components unique to second optical system 162 include a second beam splitter 180, an second objective lens 182, and a second field lens 184.

Beam of radiant energy 168 follows a first path 186 formed by the components of first optical system 158 as follows: radiation source 166 emits beam of radiant energy 168 so that it is transmitted through diffraction grating 170 and field lens 172, partially reflected by first beam splitter 174, transmitted through first objective lens 176 so that it impinges optical disc 160, reflected by optical disc 160, transmitted back through first objective lens 176, transmitted through first beam splitter 174, and transmitted through first field lens 178 so that it impinges photodetector array 188.

Beam of radiant energy 168 follows a second path 190 formed by the components of second optical system 162 as follows: radiation source 166 emits beam of radiant energy 168 so that it is transmitted through diffraction grating 170 and field lens 172, partially transmitted by first beam splitter 174, partially reflected by second beam splitter 180, transmitted through second objective lens 182 so that it impinges reference scale 164, reflected by reference scale 164, transmitted back through objective lens 82, transmitted through second beam splitter 180, and transmitted through second field lens 184 so that it impinges photodetector array 192.

The function and operation of first optical system 158 and second optical system 162 can be switched by interchanging optical disc 160 and reference scale 164 to achieve a slightly different optical head configuration which operates functionally the same as optical head configuration 157.

Photodetector arrays 188 and 192 can be any common photodetector array configuration known by those skilled in the art for use with optical disc tracking and focus systems.

Reference scale 164 has a reflective surface 194 for reflecting beam of radiant energy 168 during the recording process. Reflective surface 194 has successively spaced reflective indicia 196 for allowing beam of radiant energy 168 to track along the length of reference scale 164. The spacing between reflective indicia 196 directly correlates to the spacing between information tracks recorded on optical disc 160.

Reflective surface 194 can be made of any suitable reflective material capable of having successively spaced reflective indicia 196 that can be identified by beam of radiant energy 168. One possible method of achieving the appropriate characteristics for reflective surface 194 is to use the same technology that is used by optical disc technology. Reflective indicia 196 on reflective surface 194 can be represented by spaced optical tick marks that are technologically the same as information tracks on the reflective surface of an optical disc. This technology is well known in the art and need not be discussed in detail here. It should be noted that the spacing between reflective indicia 196 does not have to be uniform.

Apparatus 156 has a first tracking system 198 for tracking already recorded information tracks on optical disc 160 during the information retrieval process and a second tracking system 200 for tracking reflective indicia 196 on reference scale 164 during the recording process. Both first tracking system 198 and second tracking system 200 each share common tracking servo 152, a common tracking driver 202, and common tracking actuator 154. Apparatus 156 has a first focus system 208 for focussing beam of radiant energy 168 on optical disc 160 during either the information retrieval or recording process. Apparatus 156 has a second focus system 210 for focusing beam of radiant energy 168 on reflective surface 194 of reference scale 164 during the recording process.

Photodetector array 188 outputs a first tracking information signal 212 to first tracking system 198. First tracking system 198 comprises a first tracking error detector 214, a first tracking servo 216, a first control 218, common tracking servo 152, common tracking driver 202, common tracking actuator 154, a carriage control system 204 and a track position control 206. Note that carriage control system 204 and track position control 206 are also common to both first tracking system 198 and second tracking system 200.

First tracking error detector 214 reads first tracking information signal 212 and determines whether beam of radiant energy 168 is properly tracking an information track on optical disc 160 or whether beam of radiant energy 168 is drifting off an information track on optical disc 160. If beam of radiant energy 168 is drifting off an information track on optical disc 160, first tracking error detector 214 determines the distance and direction in which beam of radiant energy 168 has drifted off of the information track. This information is output by first tracking error detector 214 as a first tracking error signal 220 to a first tracking servo 216.

First tracking servo 216 reads first tracking error signal 220 and provides the required phase and gain compensation, if any, that should be used to properly align beam of radiant energy 168 with the information track being tracked. This information is output by first tracking servo 216 as a first tracking compensation signal 222 to a first control 218.

The operation of first control 218 is controlled by a read-write control 224. Read-write control 224 controls whether apparatus 156 is recording information on optical disc 160 or whether it is retrieving information from optical disc 160. Read-write control 224 outputs a first read-write control signal 226 to first control 218. First read-write control signal 226 specifies whether apparatus 156 is retrieving information from or recording information to optical disc 160. First control 218 transmits first tracking compensation signal 222 as a first control signal 228 to common tracking servo 152 when first control 218 receives information from read-write control 224, via first read-write control signal 226, that apparatus 156 is retrieving information from optical disc 160.

Common tracking servo 152 processes first control signal 228 and generates common tracking servo signal 230.

Carriage control system 204 reads common tracking servo signal 230 to control a carriage motor (not shown) for adjusting coarse positioning of a carriage sled (not shown) during the information retrieval process. The carriage sled carries optical head housing 290, shown in FIGS. 3 and 4.

Referring back to FIG. 2, track position control 206 outputs a track position control signal 232 to common tracking driver 202. Common tracking driver 202 combines common tracking servo signal 230 and track position control signal 232 to generate a common tracking driver signal 234 to control common tracking actuator 154 during the information retrieval process. Common tracking actuator 154 controls fine track positioning of beam of radiant energy 168 during the information retrieval process.

First control 218 does not transmit first tracking compensation signal 222 when first control 21 8 receives information from read-write control 224, via first read-write control signal 226, that apparatus 156 is recording information to optical disc 160. First tracking system 198 only transmits first tracking compensation signal 222 during the information retrieval process and not during the recording process.

Photodetector array 188 outputs a first focus information signal 236 to first focus system 208. First focus system 208 comprises a first focus error detector 238, a first focus servo 240, a first focus driver 242, and a first focus actuator 244.

First focus error detector 238 reads first focus information signal 236 and determines whether beam of radiant energy 168 is properly focused on optical disc 160. First focus error detector 238 determines the degree that beam of radiant energy 168 is out of focus as it impinges optical disc 160, if it is out of focus at all. This information is output by first focus error detector 238 as a first focus error signal 246 to first focus servo 240.

First focus servo 240 reads first focus error signal 246 and provides the required phase and gain compensation, if any, to properly focus beam of radiant energy 168 on optical disc 160. This information is output by first focus servo 240 as a first focus compensation signal 248 to first focus driver 242. First focus driver 242 can be any electrical component or components suitable for insuring the integrity of first focus compensation signal 248. One possibility is to use an operational amplifier for first focus driver 242 to amplify first focus compensation signal 248.

First focus driver 242 transmits first focus compensation signal 248 as a first focus driver signal 250 to control first focus actuator 244. First focus actuator 244 responds to first focus driver signal 250 to control the spacial distance of first objective lens 176 from optical disc 160 to properly focus beam of radiant energy 168 on optical disc 160.

Photodetector array 192 outputs a second tracking information signal 252 to second tracking system 200. Second tracking system 200 comprises a second tracking error detector 254, a second tracking servo 256, a second control 258, common tracking servo 152, common tracking driver 202, common tracking actuator 154, carriage control system 204 and track position control 206.

Second tracking error detector 254 reads second tracking information signal 252 and determines whether beam of radiant energy 168 is properly tracking reflective indicia 196 on reference scale 164. If beam of radiant energy 168 is not properly tracking reference scale 164, second tracking error detector 254 determines the distance and direction in which beam of radiant energy 168 is off track. This information is output by second tracking error detector 254 as a second tracking error signal 260 to a second tracking servo 256.

Second tracking servo 256 reads second tracking error signal 260 and provides the required phase and gain compensation, if any, that should be used to properly align beam of radiant energy 168 with reference scale 164. This information is output by second tracking servo 256 as a second tracking compensation signal 262 to second control 258.

The operation of second control 258 is controlled by a read-write control 224. Read-write control 224 controls whether apparatus 156 is recording information on optical disc 160 or whether it is retrieving information from optical disc 160. Read-write control 224 outputs a second read-write control signal 264 to second control 258. Second read-write control signal 264 specifies whether apparatus 156 is retrieving information from or recording information to optical disc 160. Second control 258 transmits second tracking compensation signal 262 as a second control signal 266 to common tracking servo 152, when second control 258 receives information from read-write control 224, via second read-write control signal 264, that apparatus 156 is recording information on optical disc 160.

Common tracking servo 152 processes second control signal 266 and generates common tracking servo signal 230.

Carriage control system 204 reads common tracking servo signal 230 to control the carriage motor (not shown) for adjusting coarse positioning of the carriage sled (not shown) during the recording process.

Track position control 206 outputs track position control signal 232 to common tracking driver 202. Common tracking driver 202 combines track position control signal 232 and common tracking servo signal 230 to generate a common tracking driver signal 234 to control common tracking actuator 154 during the recording process. Common tracking actuator 154 controls fine track positioning of beam of radiant energy 168 during the recording process.

Second control 258 does not transmit second compensation signal 262 when second control 258 receives information from read-write control 224, via second read-write control signal 264, that apparatus 156 is retrieving information from optical disc 160. Second tracking system 200 is only active during the recording process and is essentially disengaged during the information retrieval process.

Photodetector array 192 outputs a second focus information signal 268 to second focus system 210. Second focus system 210 comprises a second focus error detector 270, a second focus servo 272, a second focus driver 274, and a second focus actuator 276.

Second focus error detector 270 reads second focus information signal 268 and determines whether beam of radiant energy 168 is properly focused on reflective surface 194 of reference scale 164. Second focus error detector 270 determines the degree that beam of radiant energy 168 is out of focus as it impinges reference scale 164, if it is out of focus at all. This information is output by second focus error detector 270 as a second focus error signal 278 to a second focus servo 272.

Second focus servo 272 reads first focus error signal 278 and provides the required phase and gain compensation, if any, to properly focus beam of radiant energy 168 on reflective surface 194 of reference scale 164. This information is output by second focus servo 272 as a second focus compensation signal 280 to a second focus driver 274. Second focus driver 274 can be any electrical component or components suitable for insuring the integrity of second focus compensation signal 280. One possibility is to use an operational amplifier for second focus driver 274 to amplify second focus compensation signal 280.

Second focus driver 274 transmits second compensation signal 280 as a second focus driver signal 282 to control second focus actuator 276. Second focus actuator 276 responds to second focus driver signal 282 to control the spacial distance of second objective lens 182 from reflective surface 194 of reference scale 164 to properly focus beam of radiant energy 168 on reference scale 164.

Read-write control 224 generates radiation source control signal 284 to control the intensity of beam of radiant energy 168 emitted by radiation source 166. Beam of radiant energy 168 has a greater level of intensity during the recording process and a smaller level of intensity during the information process.

During the recording process, read-write control 224 causes radiation source 166 to emit beam of radiant energy 168 at an intensity of sufficient level to record information on optical disc 160. Beam of radiant energy 168 follows first path 186 formed by first optical system 158 causing optical disc 160 to be impinged by beam of radiant energy 168 and causing photodetector array 188 to be impinged by beam of radiant energy 168 reflected by optical disc 160. Beam of radiant energy 168 also follows second path 190 formed by second optical system 162 causing reflective surface 194 of reference scale 164 to be impinged by beam of radiant energy 168 and causing photodetector array 192 to be impinged by beam of radiant energy 168 reflected by reference scale 164.

Read-write control 224 activates second tracking system 200 and deactivates first tracking system 198 during the recording process by sending appropriate control signals to first control 218 and second control 258.

Second tracking system 200 operating in cooperation with second optical system 162 causes beam of radiant energy 168 to advance along the length of reflective surface 194 of reference scale 164 by tracking successive reflective indicia 196 on reflective surface 194. First optical system 158 follows the lead of second optical system working in cooperation with second tracking system 200, by radially advancing beam of radiant energy 168 across the surface of rotating optical disc 160 in direct correspondence with the movement of beam of radiant energy 168, formed by second optical system 162, across the length of reference scale 164.

During the information retrieval process, read-write control 224 causes radiation source 166 to emit beam of radiant energy 168 at an intensity level sufficient to allow the retrieval of information from optical disc 160, while at the same time limiting the intensity so that the information already recorded on optical disc 160 is not recorded over and lost. Read-write control 224 activates first tracking system 198 and deactivates second tracking system 200 during the recording process by sending appropriate control signals to first control 218 and second control 258.

First optical system 158 operates in cooperation with first tracking system 198 in much the same fashion that conventional optical disc playback machines operate when retrieving information from an optical disc. First optical system 158 operating in cooperation with first tracking system 198 causes beam of radiant energy 168 to follow information tracks formed on optical disc 160 during a prior recording process.

Both first focus system 208 and second focus system 210 are used during the recording process. First focus system 208 ensures that beam of radiant energy 168 acquires focus on optical disc 160. Second focus system ensures that beam of radiant energy 168 acquires focus on reflective surface 194 of reference scale 164. Only first focus system 208 is relied upon during the information retrieval process.

Figure 3:
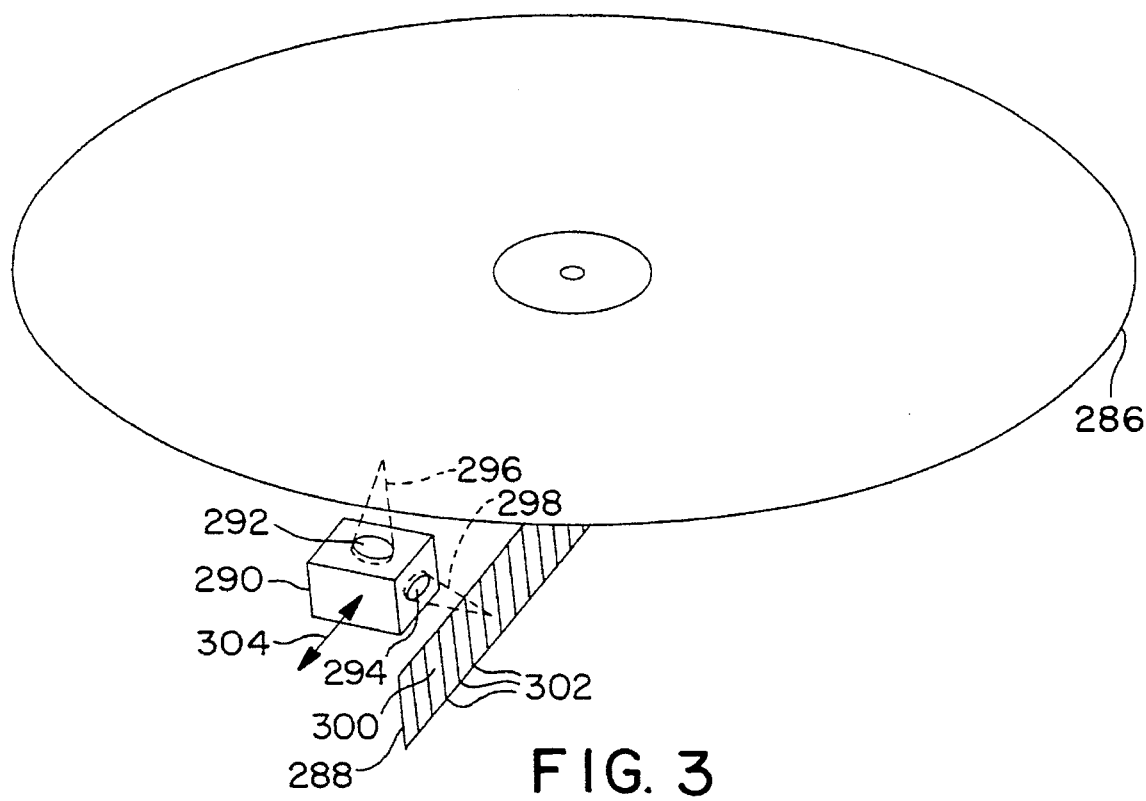
FIG. 3 is a pictorial representation viewed from a convenient perspective showing one embodiment of an optical disc, optical head housing and optical reference scale configuration.
Figure 4:
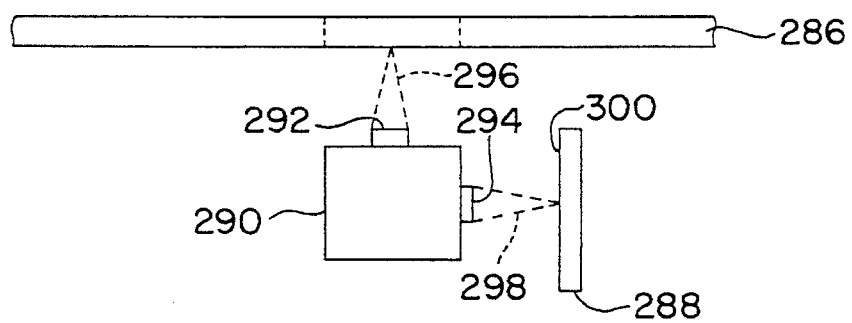
FIG. 4 is a side elevation of the optical disc, optical head housing and optical reference scale configuration shown in FIG. 3.

Referring to FIGS. 3 and 4, there is shown an optical disc 286, a reference scale and an optical head housing 290. Optical head housing 290 has a first objective lens 292 and a second objective lens 294. First objective lens 292 is used for directing a beam of radiant energy 296 towards optical disc 286, focusing beam of radiant energy 296 upon the surface of optical disc 286, recording information tracks on optical disc 286 during the recording process, and tracking information tracks on optical disc 286 during the information retrieval process.

Second objective lens 294 is used for directing beam of radiant energy 298 towards reference scale 288, focusing beam of radiant energy 298 upon a reflective surface 300 of reference scale 288, and for tracking reflective indicia 302 on reflective surface 300 along the length of reference scale 288 during the recording process.

Optical head housing 290 should generally run along a radial axis parallel to optical disc 286 with first objective lens 292 facing the surface of optical disc 286. The longitudinal axis of reference scale 288 should be positioned parallel to the radial axis of optical disc 286 along which optical head housing 290 runs, as shown by arrow 304. Reference scale 288 should also be positioned such that reflective surface 300 bearing reflective indicia 302 faces second objective lens 294.

The angle formed by beams of radiant energy 296 and 298 emanating from first objective lens 296 and second objective lens 298 can be any number of angles provided second objective lens 294 and reflective surface 300 of reference scale 288 face each other. One possible configuration as depicted in FIGS. 3 and 4 is to have beam of radiant energy 296 emanating from first objective lens 292 and to beam of radiant energy 298 emanating from second objective lens 294 such that the two beams form a 90 degree angle. In this configuration, the width of reference scale 288 would be positioned at a 90 degree angle with the surface of optical disc 286.

During the recording process, optical head housing 290 moves radially across the surface of rotating optical disc 286 by tracking across reflective indicia 302 on reflective surface 300 of reference scale 288. Reference scale 288 is tracked by impinging beam of radiant energy 298 upon reflective indicia 302 on reflective surface 300 through second objective lens 294 of optical head housing 290. As optical head housing 290 tracks reference scale 288, beam of radiant energy 296 is transmitted through first objective lens 292 so as to impinge optical disc 286 and record information thereon, causing information tracks to be formed on optical disc 286.

Figure 5:
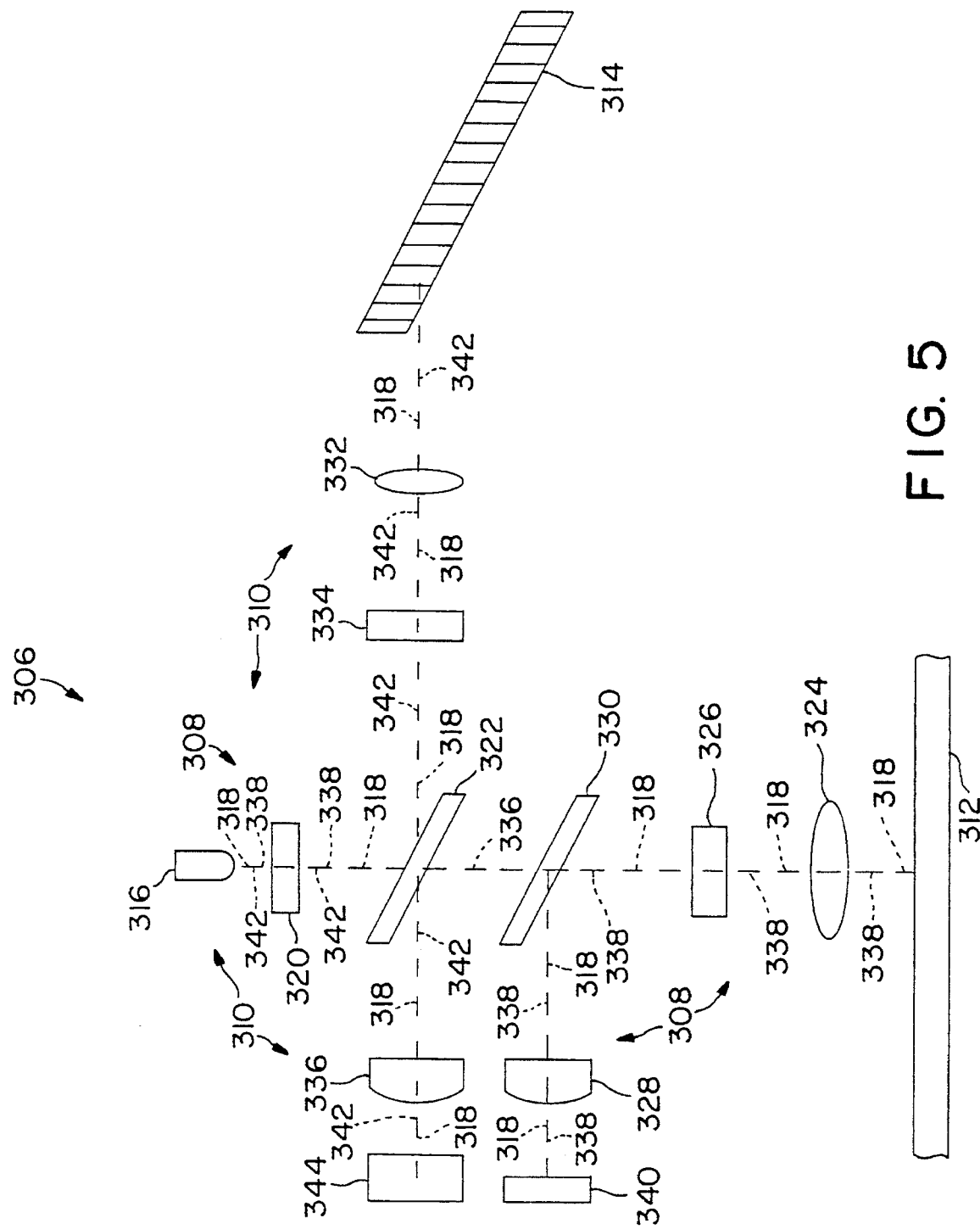
FIG. 5 is a schematic drawing showing a second optical head configuration for use with the optical disc apparatus according to the invention.

Referring to FIG. 5, there is shown a second optical head configuration 306 having a first optical system 308 and a second optical system 310. First optical system 308 and a second optical system 310 may be used in place of first optical system 12 and second optical system 16 in apparatus 10 shown in FIG. 1, or in place of first optical system 158 and second optical system 162 in apparatus 156 shown in FIG. 2.

Referring back to FIG. 5, first optical system 308 is used during the processes of recording information to and retrieving recorded information from an optical disc 312. Second optical system 310 is used exclusively in cooperation with first optical system 308 during the process of recording information on an optical disc. During the recording process, second optical system 310 tracks a precision optical reference scale 314 to control the pitch between information tracks recorded on optical disc 312 with first optical system 308. First optical system 308 follows the lead of second optical system 310 when recording information on optical disc 312.

First optical system 308 and second optical system 310 each share optical components that are common to both systems as well as utilizing separate optical components that are unique to each system. Optical components common to both first optical system 308 and second optical system 310 include a radiation source 316 for emitting a beam of radiant energy 318, a diffraction grating 320 for splitting beam of radiant energy 318 into two or more beams, and a second beam splitter 322. Diffraction grating 320 may be either omitted or replaced with a collimating lens in a system utilizing a single beam of radiant energy.

Radiation source 316 has the same characteristics as radiation source 20 in apparatus 10 shown in FIG. 1 and radiation source 166 in apparatus 156 shown in FIG. 2.

Referring back to FIG. 5, optical components unique to first optical system 308 include a first beam splitter 330, a first objective lens 324, a first field lens 328, and a first auxiliary field lens 326. Optical components unique to second optical system 310 include a second objective lens 332, a second field lens 336, and a second auxiliary field lens 334.

Beam of radiant energy 318 follows a first path 338 formed by the components of first optical system 308 as follows: radiation source 316 emits beam of radiant energy 318 so that it is transmitted through diffraction grating 320, second beam splitter 322, first beam splitter 330, first auxiliary field lens 326, and first objective lens 324 so that it impinges optical disc 312, reflected by optical disc 312, transmitted back through first objective lens 324 and first auxiliary field lens 326, partially reflected first beam splitter 330, and transmitted through first field lens 328 so that it impinges photodetector array 340.

Beam of radiant energy 318 follows a second path 342 formed by the components of second optical system 310 as follows: radiation source 316 emits beam of radiant energy 318 so that it is transmitted through diffraction grating 320, partially reflected by second beam splitter 322, transmitted through second auxiliary field lens 334, transmitted through second objective lens 332 so that it impinges reference scale 314, reflected by reference scale 314, transmitted back through second objective lens 332, transmitted through second auxiliary field lens 334, transmitted through second beam splitter 322, and transmitted through second field lens 336 so that it impinges photodetector array 344.

The function and operation of first optical system 308 and second optical system 310 can be switched by interchanging optical disc 312 and reference scale 314 to achieve a slightly different optical head configuration which operates functionally the same as optical head configuration 306.

Photodetector arrays 340 and 344 have the same characteristics as photodetector arrays 42 and 46 in apparatus 10 shown in FIG. 1 and photodetector arrays 188 and 192 in apparatus 156 shown in FIG. 2.

Reference scale 314 has the same characteristics as reference scale 18 in apparatus 10 shown in FIG. 1 and reference scale 164 in apparatus 156 shown in FIG. 2.

In operation, first optical system 308 and a second optical system 310 operate in the same manner as first optical system 12 and second optical system 16 in apparatus 10 operate, shown in FIG. 1, and in the same manner as optical system 158 and second optical system 162 in apparatus 156 operate, shown in FIG. 2.

Figure 6:
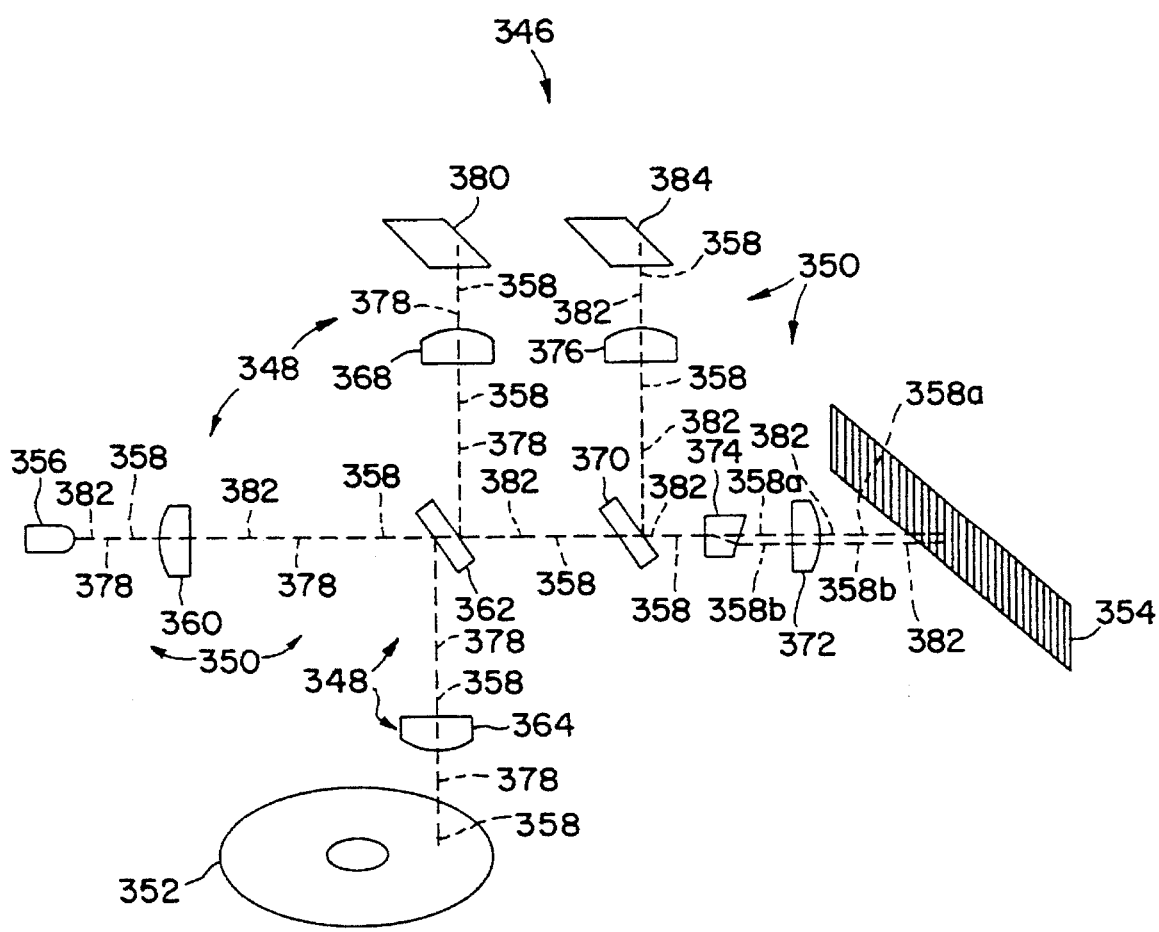
FIG. 6 is a schematic drawing showing a third optical head configuration using a prism for creating two tracking beams for tracking a reference scale.
Figure 7:
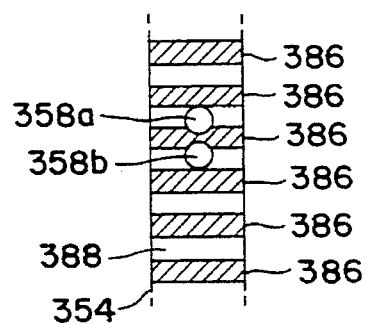
FIG. 7 is a detailed exploded view of the two optical tracking beams impinging the reference scale shown in FIG. 6.

Referring to FIGS. 6 and 7, there is shown a third optical head configuration 346 having a first optical system 348 and a second optical system 350. First optical system 348 and a second optical system 350 may be used in place of first optical system 12 and second optical system 16 in apparatus 10 shown in FIG. 1, or in place of first optical system 158 and second optical system 162 in apparatus 156 shown in FIG. 2.

Referring back to FIGS. 6 and 7, first optical system 348 is used during the processes of recording information to and retrieving recorded information from an optical disc 352. Second optical system 350 is used exclusively in cooperation with first optical system 348 during the process of recording information on an optical disc. During the recording process, second optical system 350 tracks a precision optical reference scale 354 to control the pitch between information tracks recorded on optical disc 352 with first optical system 348. First optical system 348 follows the lead of second optical system 350 when recording information on optical disc 352.

First optical system 348 and second optical system 350 each share optical components that are common to both systems as well as utilizing separate optical components that are unique to each system. Optical components common to both first optical system 348 and second optical system 350 include a radiation source 356 for emitting a beam of radiant energy 358, a field lens 360, and a first beam splitter 362.

Radiation source 356 has the same characteristics as radiation source 20 in apparatus 10 shown in FIG. 1 and radiation source 166 in apparatus 156 shown in FIG. 2.

Referring back to FIGS. 6 and 7, optical components unique to first optical system 348 include a first objective lens 364 and a first field lens 368. Optical components unique to second optical system 350 include a second beam splitter 370, a prism 374, a second objective lens 372, and a second field lens 376.

Beam of radiant energy 358 follows a first path 378 formed by the components of first optical system 348 as follows: radiation source 356 emits beam of radiant energy 358 so that it is transmitted through field lens 360, partially reflected by first beam splitter 362, transmitted through first objective lens 364 so that it impinges optical disc 352, reflected by optical disc 352, transmitted back through first objective lens 364, transmitted through first beam splitter 362, and transmitted through first field lens 368 so that it impinges photodetector array 380.

Beam of radiant energy 358 follows a second path 382 formed by the components of second optical system 350 as follows: radiation source 356 emits beam of radiant energy 358 so that it is transmitted through field lens 360, transmitted by first beam splitter 362, transmitted by second beam splitter 370, transmitted through prism 374 so that beam of radiant energy 358 is split into a first beam of radiant energy 358a and a second beam radiant energy 358b, both first beam of radiant energy 358a and second beam of radiant energy 358b are transmitted through second objective lens 372 so as to impinge reference scale 354, both first beam of radiant energy 358a and second beam of radiant energy 358b are reflected by reference scale 354, both first beam of radiant energy 358a and second beam of radiant energy 358b are transmitted back through prism 374 as a beam of radiant energy 358 which is partially reflected by second beam splitter 370, and transmitted through second field lens 376 so that it impinges photodetector array 384.

Photodetector arrays 380 and 384 have the same characteristics as photodetector arrays 42 and 46 in apparatus 10 shown in FIG. 1 and photodetector arrays 188 and 192 in apparatus 156 shown in FIG. 2.

Reference scale 354 has the same characteristics as reference scale 18 in apparatus 10 shown in FIG. 1 and reference scale 164 in apparatus 156 shown in FIG. 2.

Referring to FIG. 7, there is shown first beam of radiant energy 358a and second beam of radiant energy 358b impinging reflective surface 388 of reflective scale 354. First beam of radiant energy 358a and second beam of radiant energy 358b can be positioned such that the centers of the beams are sequentially aligned with the longitudinal axis of reference scale 354. This allows first beam of radiant energy 358a and second beam of radiant energy 358b to straddle reflective indica 386 as shown in FIG. 7 and achieve smoother and more accurate tracking of reference scale 354 during the recording process.

In operation, first optical system 348 and a second optical system 350 operate in the same manner as first optical system 12 and second optical system 16 in apparatus 10 operate, shown in FIG. 1, and in the same manner as optical system 158 and second optical system 162 in apparatus 156 operate, shown in FIG. 2.

What is claimed is:

1. An apparatus for recording information on a portion of an optical disc that rotates about an axis and does not have pre-manufactured tracks for recording information comprising:

a radiation source for emitting radiant energy;

a first optical system for impinging a first beam of said radiant energy on the optical disk;

a second optical system for producing a second beam of said radiant energy;

a reference scale for controlling a spacing between information tracks being formed on the optical disc while recording information thereon, said reference scale having spaced apart indicia representing a pitch between the information tracks, wherein said second beam impinges on said reference scale and interacts therewith to define a third beam, and wherein said reference scale is stationary with respect to the axis of the optical disc;

a movable carriage carrying a portion of said first optical system and said second optical system, wherein movement of said carriage displaces said second beam along a longitudinal axis of said reference scale;

a coarse tracking means responsive to said third beam for coarsely positioning said second beam along said reference scale; and a fine tracking means responsive to said third beam for finely positioning said second beam along said reference scale;

wherein said first beam radially advances across the surface of the rotating optical disc in correspondence with the displacement of said second beam along said reference scale.

2. The apparatus according to claim 1, wherein said first optical system and said second optical system have a common set of optical components;

said first optical system has a first set of optical components unique to said first optical system; and said second optical system has a second set of optical components unique to said second optical system.

3. The apparatus according to claim 2, wherein said common set comprises a radiation source, a field lens, and a first beam splitter;

said first set comprises a first objective lens and a first field lens; and said second set comprises a second objective lens, and a second field lens.

4. The apparatus according to claim 3, wherein said common set further comprises a diffraction grating.

5. The apparatus according to claim 3, wherein said second set further comprises a second beam splitter.

6. The apparatus according to claim 1, wherein said coarse tracking means and said fine tracking means act on said carriage.

7. The apparatus according to claim 1, wherein at least a portion of said first optical system and said second optical system are disposed in said carriage.

8. The apparatus according to claim 1, wherein said carriage comprises a sled riding on a track and carrying an optical head housing thereon.

9. The apparatus according to claim 1, wherein said reference scale is optically reflective, and said third beam is reflected therefrom.

10. The apparatus according to claim 1, wherein said indicia of said reference scale contain only information representing the pitch between information tracks.

11. The apparatus according to claim 1, wherein said first optical system and said second optical system comprise a common actuator.

12. The apparatus according to claim 11, further comprising a common tracking servo for tracking operations of said first optical system in a first mode of operation wherein information is being read from the optical disk and for tracking operations of said second optical system wherein in a second mode of operation information is being recorded on the optical disk.

13. The apparatus according to claim 11, further comprising a read-write control for selecting said first mode of operation and said second mode of operation.

14. A method for recording information on a portion of a rotating optical disc that does not have pre-manufactured information tracks, comprising the steps of:

emitting a beam of radiant energy from a radiation source;

forming a first path for said beam of radiant energy with a first optical system, said first path extending from said radiation source to the optical disc;

forming a second path for said beam of radiant energy with a second optical system, said second path extending from said radiation source to a non-rotating reference scale, wherein a portion of said second path of said beam of radiant energy is in common with a portion of said first path of said beam of radiant energy;

tracking said reference scale with said second optical system for coarsely positioning said first optical system with respect to the optical disc;

thereupon tracking said reference scale with said second optical system for finely positioning said first optical system with respect to the optical disk; and irradiating the optical disk through said first optical system to record information thereon.

\* \* \* \* \*

UNITED STATES PATENT AND TRADEMARK OFFICE
CERTIFICATE OF CORRECTION

PATENT NO. : 5,590,102                                    Page 1 of 4
DATED : Dec. 31, 1996
INVENTOR(S) : Ludwig Ceshkovsky It is certified that error appears in the above-indentified patent and that said Letters Patent is hereby corrected as shown below:

Column 3, line 59, delete the word
--exploded-- between "detailed" and "view".

On title page, the following patents should be inserted in item [56]

| PATENT NUMBER | ISSUE DATE | PATENTEE | CLASS | SUBCLASS |
|---|---|---|---|---|
| 3,530,258 | 09/22/70 | D.P. Gregg et al. | 179 | 100.3 |
| 3,794,410 | 02/26/74 | Elliott | 350 | 285 |
| 3,932,700 | 01/13/76 | Snopko | 178 | 6.6 R |
| 3,997,715 | 12/14/76 | Elliott | 178 | 6.6 DD |
| 4,152,586 | 05/01/79 | Elliott et al. | 250 | 201 |
| 4,161,753 | 07/17/79 | Bailey et al. | 358 | 128 |
| 4,310,919 | 01/12/82 | Slaten | 369 | 275 |
| 4,337,534 | 06/29/82 | Basilico et al. | 369 | 111 |
| 4,353,090 | 10/05/82 | Broadbent | 358 | 342 |
| 4,357,533 | 11/02/82 | Winslow | 250 | 204 |
| 4,358,774 | 11/09/82 | Wilkinson | 346 | 1.1 |
| 4,374,323 | 02/15/83 | Winslow et al. | 250 | 201 |
| 4,397,805 | 08/09/83 | Holmes | 264 | 328.14 |
| 4,406,000 | 09/20/83 | Shoji et al. | 369 | 44 |
| 4,412,743 | 11/01/83 | Eberly | 356 | 237 |
| 4,414,655 | 11/08/83 | Shoji et al. | 369 | 44 |
| 4,445,209 | 04/24/84 | Mickelson et al. | 369 | 45 |
| 4,450,488 | 05/22/84 | Golding | 358 | 342 |
| 4,463,389 | 07/31/84 | Golding | 358 | 343 |
| 4,492,992 | 01/08/85 | Rooney et al. | 360 | 73 |
| 4,499,569 | 02/12/85 | Lopez De Romana | 369 | 45 |
| 4,514,771 | 04/30/85 | Stark et al. | 360 | 73 |

UNITED STATES PATENT AND TRADEMARK OFFICE
CERTIFICATE OF CORRECTION

PATENT NO. : 5,590,102
DATED : Dec. 31, 1996
INVENTOR(S) : Ludwig Ceshkovsky

It is certified that error appears in the above-indentified patent and that said Letters Patent is hereby corrected as shown below:

| PATENT NUMBER | ISSUE DATE | PATENTEE | CLASS | SUBCLASS |
|---|---|---|---|---|
| 4,519,004 | 05/21/85 | Wilkinson et al. | 358 | 342 |
| 4,530,018 | 07/16/85 | Hoshino et al. | 360 | 73 |
| 4,530,083 | 07/16/85 | Ishihara | 369 | 267 |
| 4,571,712 | 02/18/86 | Romano et al. | 369 | 44 |
| 4,607,157 | 08/19/86 | Millar et al. | 250 | 201 |
| 4,638,377 | 01/20/87 | Dakin | 358 | 343 |
| 4,700,334 | 10/13/87 | Shinkai | 369 | 44 |
| 4,703,368 | 10/27/87 | Dakin | 358 | 342 |
| 4,727,433 | 02/23/88 | Dakin | 358 | 343 |
| 4,757,393 | 07/12/88 | Dakin et al. | 358 | 342 |
| 4,779,251 | 10/18/88 | Burroughs | 358 | 342 |
| 4,796,098 | 01/03/89 | Giddings | 358 | 342 |
| 4,853,918 | 08/01/89 | Kobayashi et al. | 369 | 44 |
| 4,855,978 | 08/08/89 | Kanamaru | 369 | 32 |
| 4,866,695 | 09/12/89 | Suzuki et al. | 369 | 266 |
| 4,924,455 | 05/08/90 | Fujiie et al. | 369 | 44.21 |
| 4,939,712 | 07/03/90 | Abe et al. | 369 | 32 |
| 4,980,876 | 12/25/90 | Abate et al. | 369 | 44.11 |
| 5,018,020 | 05/21/91 | Dakin | 358 | 310 |
| 5,036,506 | 07/30/91 | Bierhoff | 369 | 44.28 |
| 5,079,756 | 01/07/92 | Kuwabara | 369 | 44.28 |
| 5,086,419 | 02/04/92 | Yanagi | 369 | 32 |
| 5,087,973 | 02/11/92 | Citta et al. | 358 | |
| 5,124,964 | 06/23/92 | Hayashi | 369 | 44.11 |
| 5,146,442 | 09//08/92 | Shikichi | 369 | 44.29 |
| 5,168,356 | 12/01/92 | Acampora et al. | 358 | 133 |

UNITED STATES PATENT AND TRADEMARK OFFICE
CERTIFICATE OF CORRECTION

PATENT NO. : 5,590,102
DATED : Dec. 31, 1996
INVENTOR(S) : Ludwig Ceshkovsky

It is certified that error appears in the above-indentified patent and that said Letters Patent is hereby corrected as shown below:

| PATENT NUMBER | ISSUE DATE | PATENTEE | CLASS | SUBCLASS |
|---|---|---|---|---|
| 5,170,386 | 12/08/92 | Tateishi | 369 | 50 |
| 5,177,725 | 01/05/93 | Terashi | 369 | 44.29 |
| 5,189,293 | 02/23/93 | Leenknegt | 250 | 201.5 |
| 5,210,726 | 05/11/93 | Jackson et al. | 369 | 32 |
| 5,216,647 | 06/01/93 | Kitani | 369 | 44.28 |
| 5,247,501 | 09/21/93 | Hashimoto et al. | 369 | 44.11 |
| 5,257,251 | 10/26/93 | Chow et al. | 369 | 44.25 |
| 5,267,226 | 11/30/93 | Matsuoka et al. | 369 | 44.11 |
| 5,294,894 | 03/15/94 | Gebara | 331 | 1 A |
| 5,304,953 | 04/19/94 | Heim et al. | 331 | 1 A |
| 5,315,571 | 05/24/94 | Maeda et al. | 369 | 50 |
| 5,319,622 | 06/07/94 | Martin | 369 | 44.14 |
| 5,327,407 | 07/05/94 | Suzuki et al. | 369 | 44.25 |
| 5,379,282 | 01/03/95 | Wachi | 369 | 44.35 |
| 5,394,385 | 02/28/95 | Sakurada et al. | 369 | 44.23 |
| 5,396,477 | 03/07/95 | Matsumoto et al. | 369 | 44.28 |
| 5,459,309 | 10/17/95 | Kagami et al. | 250 | 201.5 |

UNITED STATES PATENT AND TRADEMARK OFFICE
CERTIFICATE OF CORRECTION

PATENT NO. : 5,590,102
DATED : Dec. 31, 1996
INVENTOR(S) : Ludwig Ceshkovsky

It is certified that error appears in the above-indentified patent and that said Letters Patent is hereby corrected as shown below:

FOREIGN PATENT OR PUBLISHED FOREIGN PATENT APPLICATION

| DOCUMENT NUMBER | PUBLICATION DATE | COUNTRY OR PATENT OFFICE | CLASS | SUBCLASS | TRANSLATION YES | NO |
|---|---|---|---|---|---|---|
| JP59068829 | 04/18/84 | JAPAN | G11B7 | 08 | YES | |
| JP185071 | 10/20/84 | JAPAN | | | YES | |
| JP056256 | 04/02/83 | JAPAN | | | YES | |

**OTHER DOCUMENTS (Including Author, Title, Date\*\*, Relevant Pages, Place of Publication\*\*\*)**

| |
|---|
| Elliman, DG & PJ Connor, "Orientation and Scale Invariant Symbol Recognition Using a Hidden Markov Model," University of Nottingham, United Kingdom, 1993(?) pp 331-34. |
| Dean, Mark E., David L. Dill & Mark Horowitz, "Self-Timed Logic Using Current-Sensing Completion Detection (CSCD)," Computer Systems Laboratory, Stanford University, CA, IEEE, 1991, pp. 187-191. |
| Wong, Bennett C. & Henry Samueli, "A 200-MHz All-Digital QAM Modulator and Demodulator in 1.2- m CMOS for Digital Radio Applications," IEEE Journal of Solid-State Circuits, Vol. 26, no.12, Dec. 1991, pp 1971-1983. |
| Samueli, Henry, Charles P. Reames, Leo Mritreuil & William E. Wall, "Performance Results of a 64/256-QAM CATV Receiver Chip Set," Broadcom Corp., Los Angeles, CA & Scientific-Atlanta Inc., Norcross, GA. |

Signed and Sealed this

Fourteenth Day of July, 1998

*Attest:*

*Attesting Officer*

BRUCE LEHMAN

*Commissioner of Patents and Trademarks*